US011138306B2

(12) United States Patent
Plenderleith

(10) Patent No.: US 11,138,306 B2
(45) Date of Patent: Oct. 5, 2021

(54) PHYSICS-BASED CAPTCHA

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 786 days.

(21) Appl. No.: 15/069,600

(22) Filed: Mar. 14, 2016

(65) Prior Publication Data

US 2017/0262623 A1 Sep. 14, 2017

(51) Int. Cl.
G06F 21/36 (2013.01)
G06F 3/0484 (2013.01)

(52) U.S. Cl.
CPC .......... *G06F 21/36* (2013.01); *G06F 3/04842* (2013.01); *G06F 2221/2133* (2013.01)

(58) Field of Classification Search
CPC ...... G06F 3/04842; G06F 21/31; G06F 21/36; G06F 2221/2133
USPC ........................................................ 726/7, 19
See application file for complete search history.

(56) References Cited

U.S. PATENT DOCUMENTS

| 7,315,985 | B1 * | 1/2008 | Gauvin | H04L 41/12 715/734 |
| 8,228,336 | B1 * | 7/2012 | Dykes | G06T 13/40 345/473 |
| 8,269,778 | B1 * | 9/2012 | Baraff | G06T 13/20 345/156 |
| 8,510,795 | B1 * | 8/2013 | Gargi | G09B 5/06 382/276 |
| 8,671,058 | B1 * | 3/2014 | Isaacs | G06F 21/36 382/100 |
| 8,793,762 | B2 * | 7/2014 | Marking | H04L 63/126 380/282 |
| 8,902,234 | B1 * | 12/2014 | Sanocki | G06T 13/00 345/473 |
| 9,036,898 | B1 * | 5/2015 | Beeler | G06T 19/20 382/154 |
| 9,214,036 | B1 * | 12/2015 | Kanyuk | G06T 13/80 |
| 9,258,123 | B2 * | 2/2016 | Griffin | G06F 21/36 |

(Continued)

FOREIGN PATENT DOCUMENTS

| EP | 2410450 A1 * | 1/2012 | ............. G06F 21/31 |
| WO | WO-2017148315 A1 * | 9/2017 | ............... H04L 9/32 |
| WO | WO-2017160497 A1 * | 9/2017 | ............. G06F 21/36 |

OTHER PUBLICATIONS

Cui, "A CAPTCHA Implementation Based on 3D Animation", 2009 International Conference on Multimedia Information Networking and Security, IEEE, 2009, pp. 179-182 (Year: 2009).*

(Continued)

*Primary Examiner* — Luu T Pham
*Assistant Examiner* — Walter J Malinowski
(74) *Attorney, Agent, or Firm* — Thomas | Horstemeyer LLP

(57) ABSTRACT

Disclosed are various embodiments for generating a physics-based CAPTCHA. In a physics-based CAPTCHA, an object is placed within a scene so that a visually observable change occurs to the object. The scene is animated so that the visually observable change occurs to the object. Before and after imagery can be captured and used as a challenge and a response. Incorrect responses can be generated by altering the scene or object.

20 Claims, 8 Drawing Sheets

(56) References Cited

U.S. PATENT DOCUMENTS

| | | | | |
|---|---|---|---|---|
| 9,519,766 | B1* | 12/2016 | Bhosale | G06F 21/31 |
| 9,723,005 | B1* | 8/2017 | McInerny | H04L 63/10 |
| 2004/0220793 | A1* | 11/2004 | Hawkes | G06F 17/5009 |
| | | | | 703/22 |
| 2006/0200327 | A1* | 9/2006 | Bordes | A63F 13/10 |
| | | | | 703/6 |
| 2008/0127302 | A1* | 5/2008 | Qvarfordt | G06F 21/36 |
| | | | | 726/2 |
| 2008/0175174 | A1* | 7/2008 | Altberg | G06Q 30/02 |
| | | | | 370/259 |
| 2008/0307364 | A1* | 12/2008 | Chaudhri | G06F 3/0483 |
| | | | | 715/836 |
| 2009/0099824 | A1* | 4/2009 | Falash | G09B 9/00 |
| | | | | 703/8 |
| 2009/0232351 | A1 | 9/2009 | Kagitani et al. | |
| 2009/0235327 | A1* | 9/2009 | Jakobsson | G06F 21/31 |
| | | | | 726/2 |
| 2009/0313694 | A1* | 12/2009 | Mates | G06F 21/36 |
| | | | | 726/21 |
| 2009/0328163 | A1* | 12/2009 | Preece | G06F 21/36 |
| | | | | 726/5 |
| 2010/0113092 | A1* | 5/2010 | Mitchell | G06F 1/1632 |
| | | | | 455/556.1 |
| 2010/0134501 | A1* | 6/2010 | Lowe | G06T 13/40 |
| | | | | 345/474 |
| 2010/0218111 | A1* | 8/2010 | Mitchell | G06F 21/31 |
| | | | | 715/745 |
| 2010/0267437 | A1* | 10/2010 | Ansari | G07F 17/32 |
| | | | | 463/16 |
| 2011/0113378 | A1* | 5/2011 | Boden | G06F 21/36 |
| | | | | 715/837 |
| 2011/0122726 | A1* | 5/2011 | Vasconcelos | G01V 1/303 |
| | | | | 367/73 |
| 2011/0150267 | A1* | 6/2011 | Snelling | G06F 21/316 |
| | | | | 382/100 |
| 2011/0197268 | A1* | 8/2011 | Ravikumar | H04L 9/3271 |
| | | | | 726/6 |
| 2011/0208716 | A1* | 8/2011 | Liu | G06F 17/30247 |
| | | | | 707/710 |
| 2012/0005735 | A1* | 1/2012 | Prasanna | H04L 9/321 |
| | | | | 726/7 |
| 2012/0010743 | A1 | 1/2012 | Asai | |
| 2012/0246737 | A1* | 9/2012 | Paxton | G06F 16/24578 |
| | | | | 726/27 |
| 2012/0284781 | A1* | 11/2012 | Gentner | G06Q 10/107 |
| | | | | 726/6 |
| 2013/0031640 | A1 | 1/2013 | Fisk et al. | |
| 2013/0035996 | A1* | 2/2013 | Frey | G06Q 10/10 |
| | | | | 705/14.4 |
| 2013/0042311 | A1* | 2/2013 | Broder | G06F 21/31 |
| | | | | 726/7 |
| 2013/0079079 | A1* | 3/2013 | Bouchard | A63F 9/0612 |
| | | | | 463/9 |
| 2013/0120404 | A1* | 5/2013 | Mueller | G06T 13/00 |
| | | | | 345/474 |
| 2013/0191641 | A1* | 7/2013 | Pai | H04L 63/00 |
| | | | | 713/176 |
| 2013/0286004 | A1* | 10/2013 | McCulloch | G06T 19/006 |
| | | | | 345/419 |
| 2013/0290174 | A1* | 10/2013 | Wickliffe | G06Q 20/29 |
| | | | | 705/39 |
| 2013/0304604 | A1* | 11/2013 | Hoffman | G06Q 30/0621 |
| | | | | 705/26.5 |
| 2013/0342571 | A1* | 12/2013 | Kinnebrew | G06F 3/147 |
| | | | | 345/633 |
| 2014/0028685 | A1* | 1/2014 | Weskamp | G06T 3/60 |
| | | | | 345/473 |
| 2014/0195921 | A1* | 7/2014 | Grosz | G06F 3/1242 |
| | | | | 715/738 |
| 2014/0196133 | A1* | 7/2014 | Shuster | H04L 63/126 |
| | | | | 726/7 |
| 2014/0232816 | A1* | 8/2014 | Wilson | H04N 7/157 |
| | | | | 348/14.08 |
| 2014/0354694 | A1* | 12/2014 | Loduha | A63F 13/573 |
| | | | | 345/648 |
| 2014/0359653 | A1* | 12/2014 | Thorpe | G06F 21/00 |
| | | | | 725/30 |
| 2015/0052481 | A1* | 2/2015 | Ronkainen | G06F 3/0416 |
| | | | | 715/815 |
| 2015/0095981 | A1* | 4/2015 | Adams | H04L 63/1491 |
| | | | | 726/3 |
| 2015/0143495 | A1* | 5/2015 | Okada | H04L 63/08 |
| | | | | 726/7 |
| 2015/0279075 | A1* | 10/2015 | Myers | G06F 17/15 |
| | | | | 345/474 |
| 2015/0304634 | A1* | 10/2015 | Karvounis | H04N 13/239 |
| | | | | 348/46 |
| 2016/0027327 | A1* | 1/2016 | Jacobson | G09B 19/0084 |
| | | | | 434/263 |
| 2016/0261586 | A1* | 9/2016 | Huang | G06T 11/60 |
| 2016/0293133 | A1* | 10/2016 | Dutt | G06F 8/20 |
| 2016/0371480 | A1* | 12/2016 | Cheung | G06F 21/31 |
| 2017/0011212 | A1* | 1/2017 | Rowlingson | G06F 21/36 |
| 2017/0011537 | A1* | 1/2017 | Hahn | G06T 13/80 |
| 2017/0098067 | A1* | 4/2017 | Paluri | G06F 21/31 |
| 2017/0161490 | A1* | 6/2017 | Fedor | G06F 21/36 |
| 2017/0337373 | A1* | 11/2017 | Conti | G06F 21/554 |

OTHER PUBLICATIONS

Gupta, "Sequenced Tagged Captcha: Generation and Its Analysis", 2009 IEEE International Advance Computing Conference (IACC 2009), IEEE, 2008, pp. 1286-1291. (Year: 2008).*

Jain, "Sequenced Picture Captcha: Generation and its Strength Analysis", IEEE—Institute of Electrical and Electronics Engineers, Inc., 2009, 8 pages (Year: 2009).*

Kluever, "Evaluating the usability and secvurity of a video CAPTCHA":, Thesis, Rochester Institute of Technology, 2008, 115 pages. (Year: 2008).*

Kunitani, "Proposal of CAPTCHA Using Three Dimensional Objects", ICUIMC(IMCOM)'13, Jan. 17-19, 2013, 6 pages (Year: 2013).*

Raj, "Picture CAPTCHAs With Sequencing: Their Types and Analysis", International Journal of Digital Society (IJDS), vol. 1, issue 3 , Sep. 2010, 14 pages. (Year: 2010).*

De Chaumont. "Using physics engines to track objects in images." In Biomedical Imaging: From Nano to Macro, 2009. ISBI'09. IEEE International Symposium on, pp. 1342-1345. IEEE, 2009 (Year: 2009).*

Kim, Suzi, and Sunghee Choi. "Automatic generation of 3D typography." In ACM SIGGRAPH 2016 Posters, pp. 1-2. 2016. (Year: 2016).*

Lu, Huiqiang, Wang Yijin, and Ying Hu. "Design and implementation of three-dimensional game engine." In World Automation Congress 2012, pp. 1-4. IEEE, 2012. (Year: 2012).*

Kyriazis, Nikolaos, and Antonis Argyros. "Physically plausible 3d scene tracking: The single actor hypothesis." In Proceedings of the IEEE Conference on Computer Vision and Pattern Recognition, pp. 9-16. 2013. (Year: 2013).*

International Search Report dated May 16, 2017 for Application No. PCT/US2017/020084.

* cited by examiner

PHYSICS-BASED CAPTCHA

BACKGROUND

Completely Automated Public Turing tests to tell Computers and Humans Apart (CAPTCHAs) are challenge-response tests that are used to determine whether a user interacting with a system is human or machine. As computers become more powerful and as artificial intelligence becomes more advanced, there is a continuing need to evolve the tests employed by CAPTCHAs, as computers programmed with artificial intelligence or other image and text recognition algorithms can defeat certain weak CAPTCHA algorithms.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to generating challenge-response tests that can be used to grant or deny access to a resource. In other words, the present application relates to a Completely Automated Public Turing test to tell Computers and Humans Apart (CAPTCHA) that relies upon solving physics-based problems. The physics-based problems can rely upon intuitive Newtonian physics principles that can be generally easily understood and solved by humans but more difficult for a computer or machine to solve. The challenge-response test can be generated by capturing "before" and "after" imagery of a two-dimensional (2D) or three-dimensional (3D) scene in which an object is placed and in which an observable change occurs with respect to the object in the imagery. Such a test can be solved by a human because a human can determine, based on intuitive knowledge about Newtonian physics, what is likely to occur in an "after" image. In contrast, a computer, without information about the objects within the image and without information about the scene from which the images were generated, might be unable to solve the test.

Additionally, the textures and shapes of objects within the image and within the scene can be chosen so that they are more difficult for a computer to analyze. As an additional example, a pattern or color can be applied to an object that makes identifying or analyzing motion of the object to be difficult for a computer that is analyzing the image without additional information about the objects within the scene.

Turning now to FIG. 1, shown is an example scenario in accordance with various embodiments. In the example scenario, a user interface 102a is depicted which includes a CAPTCHA test that is generated by embodiments of the disclosure. The user interface 102a includes a scene and a challenge 103 or question that is posed with respect to a scene within the user interface 102a. The challenge 103 represents a question that can be the basis, along with the image in the user interface 102a, for a CAPTCHA that is used to determine whether to grant access to a resource for which CAPTCHA verification is desired. In the user interface 102a shown in FIG. 1, a scene is represented in an image. The scene is a three-dimensional (3D) scene. However, two-dimensional (2D) scenes can also employed by embodiments of the disclosure.

Figure 1A:
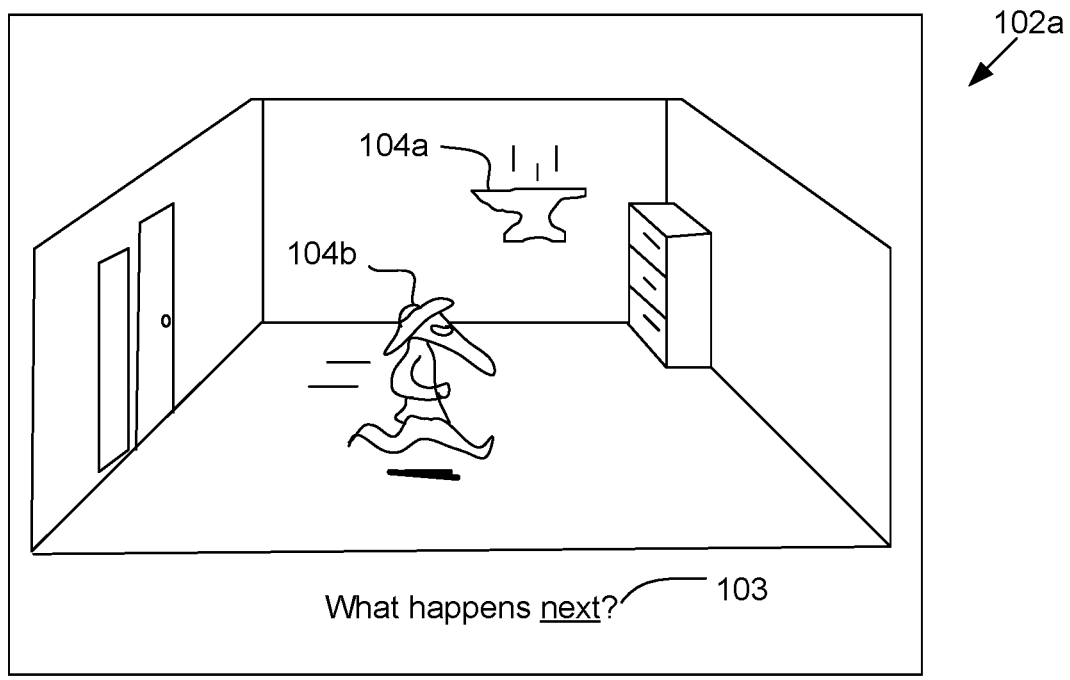
FIG. 1A is a pictorial diagram of an example user interface presenting a CAPTCHA challenge-response test to a user according to embodiments of the disclosure.

In the image, there is an object that interacts with its environment and potentially other objects in the scene. In the example of FIG. 1A, there are two objects 104a and 104b that can interact with one another as well as with the environment in the scene. The scene depicted in the image can be based upon a virtual three dimensional scene in which objects are placed. Objects can move and/or interact with other objects in the scene, such as objects 104a and 104b. Objects can also include light sources, inanimate objects, background objects, backdrops, foreground, or other objects from which a physics engine can render images or video. A light source, for example, can be activated or deactivated within a scene to toggle between an illumination of the light source and the deactivated states of the light source.

The scene can also employ a physics model that describes how objects within the scene interact with one another and with the environment within the scene. The physics model can define parameters such as gravity, friction, momentum, weight, density, viscosity, or other physical parameters for elements that are within a scene. The physics model can be interpreted by a physics engine that can render images or video of the scene based upon the position of objects within the scene and the physical parameters of the objects that are associated with the physics model. In other words, the physics engine can simulate the interactions of objects with one another and with their environment within the scene based upon the properties of the objects and on the physics model for the scene.

In the context of this disclosure, a physics engine is a software or hardware module that determines or calculates how objects within a virtual scene interact with one another or move throughout the scene based upon a physics model that is applied to the scene and the physical properties of the objects within the scene. Additionally, the physics engine can also perform graphics rendering with respect to a scene so that imagery and video of a scene that is simulated by the physics engine can be extracted and used as challenges or responses for a physics-based CAPTCHA. In some embodiments, a software or hardware module that only determines physical manipulation or interaction of objects within a scene but that does not perform graphical rendering can be used. Such a module can be used in combination with a graphics engine from which imagery and video of the scene are extracted and used as a part of a physics-based CAPTCHA.

Accordingly, the user interface 102a of FIG. 1A includes an image generated by a physics engine based upon a 3D scene in which the objects 104a and 104b are placed. In one example, the objects 104a and 104b can be placed such that an observable change will occur to at least one of the objects upon animation or further rendering of the scene. In the example of FIG. 1A, the objects 104a and 104b can be placed by a CAPTCHA engine that is tasked with creating CAPTCHAs in a scene that is rendered by a physics engine. The objects 104a and 104b can be placed in a location so that one or more of them move or change in relation to one another in a subsequent frame of the scene as rendered by the physics engine. Object 104a can be placed with a velocity and/or acceleration in a particular direction within the scene, and object 104b can be placed in a different area of the screen with a particular velocity and/or acceleration. In the example of user interface 102a, the object 104a is placed with a velocity and with a particular mass, momentum, and other physical properties. Object 104b is placed in a particular location with a gravity property acting upon the object 104b such that the object 104b will move when the scene is rendered by the physics engine.

The CAPTCHA can also be accompanied by a challenge, which asks a user to make a determination with respect to the scene. In the depicted example, the user is presented in a "before" image that is captured from the scene and asked "what happens next?" Moving onto FIG. 1B, the user is presented with a user interface 102b that provides various response choices from which the user can select. For example, the user is presented with response choices A, B, C, and D. In the example of user interface 102b, one of the answer choices is correct and the remaining choices are incorrect. Incorrect answer choices can be generated that are inconsistent with the physics model employed by the scene. For example, the objects 104a and 104b can be manipulated or modified in a way that is inconsistent with simple Newtonian physics as would be understood by a person observing the scene. In some scenarios, incorrect responses can be generated by modifying the physical properties of an object within the scene, such as a shape, texture, color, mass, velocity, or other properties that affect how and where the object might be placed within the scene by a physics engine.

Figure 1B:
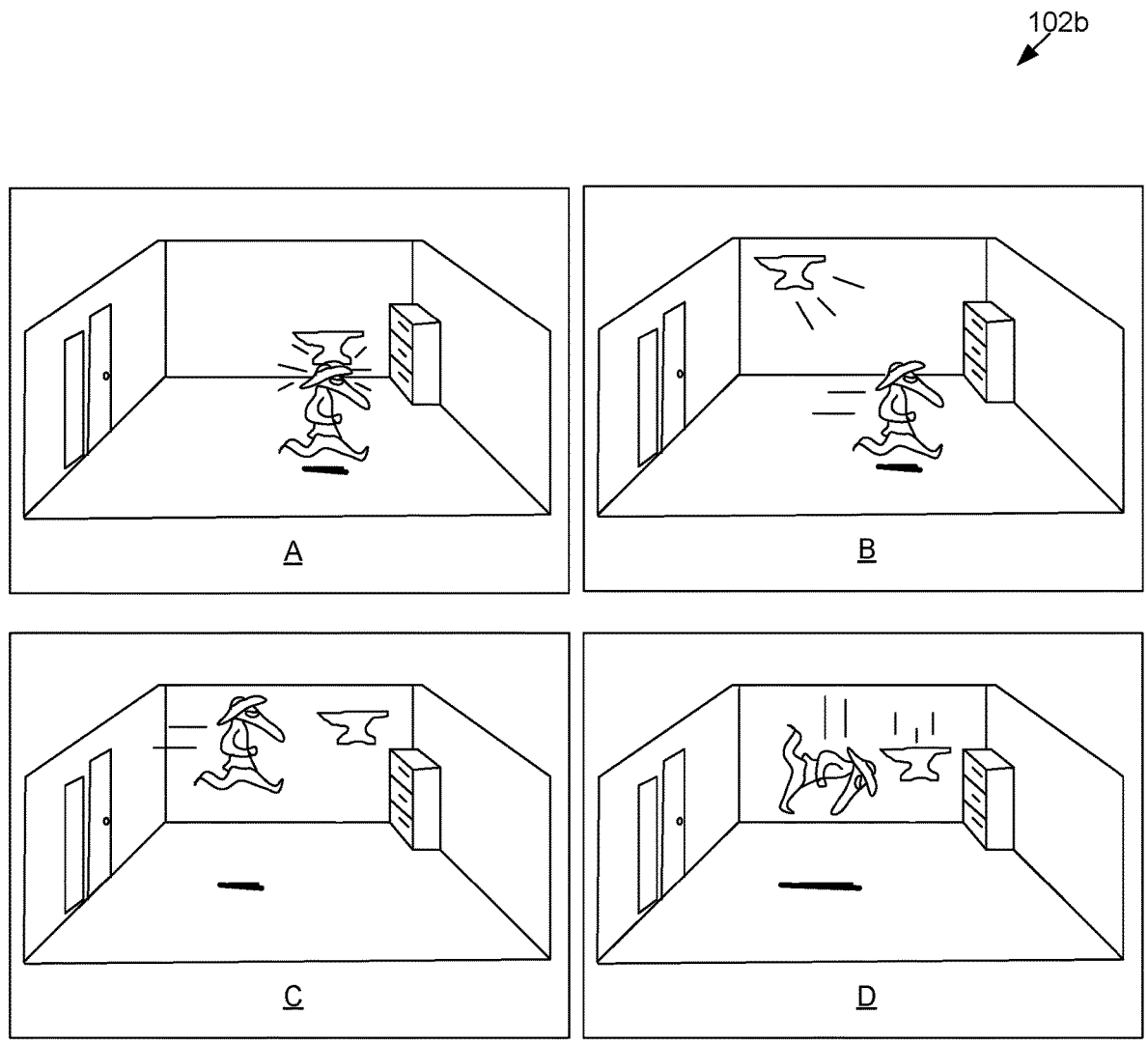
FIG. 1B is a pictorial diagram of an example user interface presenting a CAPTCHA challenge-response test to a user according to embodiments of the disclosure.

In user interface 102b, choice A is correct and choices B, C, and D are incorrect because choice A represents a likely "after" image relative to the "before" image in user interface 102a. Choices B, C, and D represent choices that are unlikely or implausible assuming a physics model that is similar to Newtonian physics where objects move and react to their surroundings in way that is similar the real world. Therefore, choice B is incorrect because an anvil is not likely to fly away in world where Newtonian physics is applied. Choice C is incorrect because object 104a, if running in a particular direction, is not likely to begin instantaneously floating alongside the anvil. Choice D is incorrect because object 104b has been made to float and is rotated. The correct and incorrect answer choices are relatively easy for a human to identify given a typical person's knowledge about how objects interact with their surroundings, each other, gravity, and other physical properties in a world where Newton physics apply. Therefore, a CAPTCHA as depicted in FIGS. 1A-1B can be used to determine whether access to a resource should be granted or to determine whether a selection of the answer choices is likely a human rather than a machine.

Other variations of CAPTCHAs that are generated according to embodiments of the disclosure are discussed below.

Figure 2:
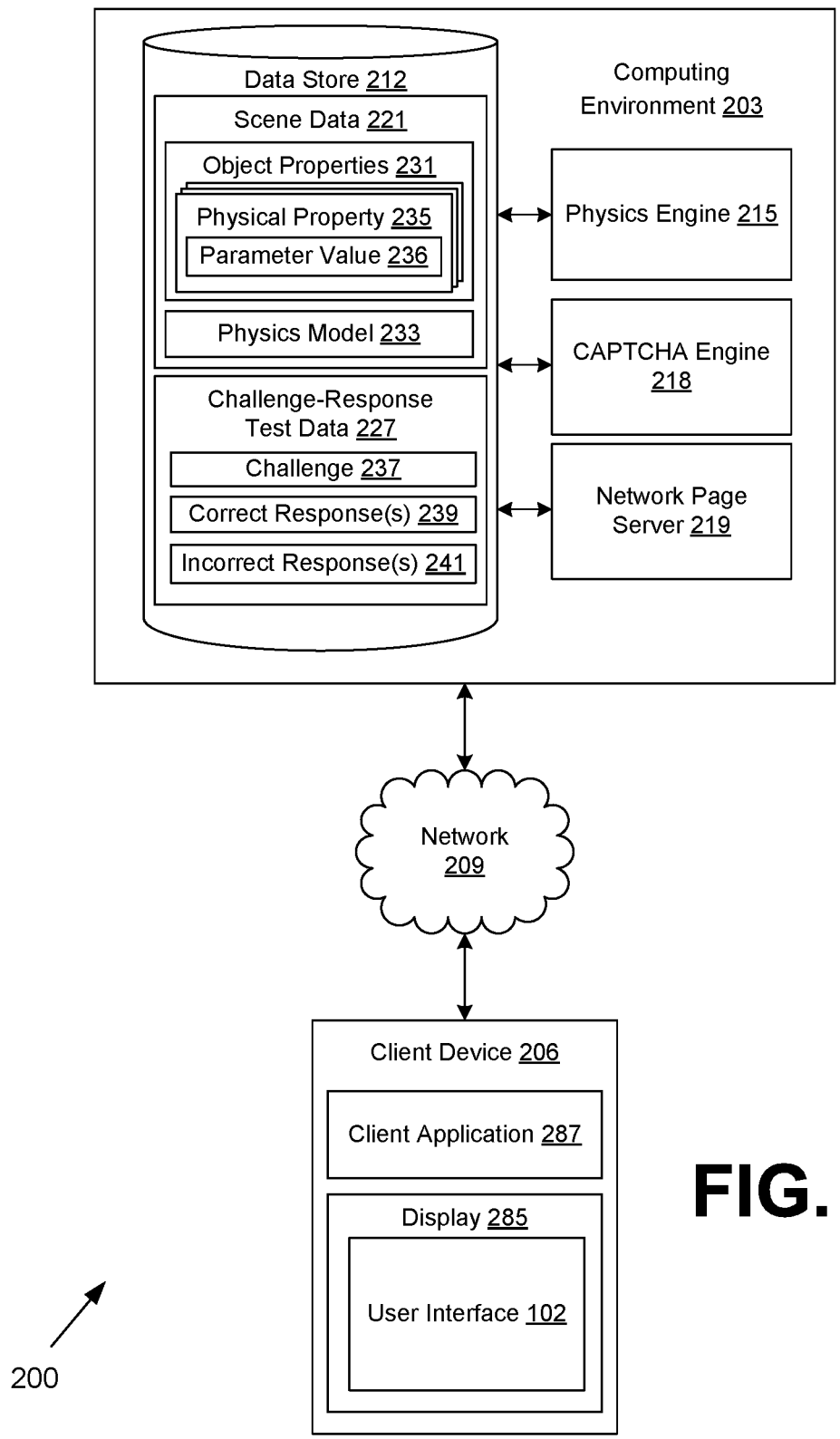
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a physics engine 215, a CAPTCHA engine 218, a network page server 219, and other applications, services, processes, systems, engines, or functionality not discussed in detail herein. The physics engine 215 is executed to render images that can be used for challenge-response tests or CAPTCHAs. The physics engine 215 can render images or video that are based on 2D or 3D scenes in which objects are placed. In this scenario, the objects placed in a scene are associated with various properties, such as a weight, mass, friction, density, velocity, acceleration, temperature, rigidity, viscosity, or any other physical property that affects how the object might interact with its environment or other objects. The physics engine can interpret physical properties about the objects in a scene as well as a physics model that is applied to the scene in order to determine the location and appearance of the objects in various frames that it renders.

The CAPTCHA engine 218 can generate CAPTCHAs, or challenge-response tests, that can be used to determine whether to grant or deny access to a resource. The CAPTCHAs can be used by a website to which a designer or administrator wishes to limit access to authenticated users or to users that are human rather than a machine. For example, an administrator of a ticketing or banking website might wish to attempt to verify that access to the site are made by computers or other devices that are operated by humans rather than by bots or artificial intelligence (AI). The CAPTCHA engine 218 can also verify whether a particular CAPTCHA that is placed within a user interface provided to a client device 206 is correctly or incorrectly solved.

The CAPTCHA engine 218 can generate CAPTCHAs, or challenge-response tests, by interacting with an application programming interface (API) provided by the physics engine 215 and create a scene in which objects are placed. The objects can be placed such that an observable change will occur to the objects within the scene when the scene is animated and rendered by the physics engine 215. In one embodiment, the CAPTCHA engine 218 can direct the physics engine 215 to create a scene and place an object within the scene such that an observable change will occur to the object. The CAPTCHA engine 218 can also extract a "before" image of the scene before the change occurs to the object and one or more "after" images of the scene after the change occurs to the object.

An observable change can include movement of the object, crushing or deformation of the object, rotation of the object, or other observable changes that can be determined by a visual inspection of the object within the scene. As another example, the observable change can include freezing, boiling, melting, or other physical changes to an object. The observable change can also represent a manner in which two objects might interact with one another. For example, an object might represent a machine with one or more movable parts. Accordingly, an observable change can include operation of such a machine. Such a machine could include a gearing system, and the observable change could represent the gears of a gearing system turning in an expected fashion. Another example of an observable change is an impact between two objects within a scene.

The CAPTCHA engine 218 can extract images or videos from the physics engine 215 that represent differing points in time during the animation and rendering of a scene. The images or videos can be used as a part of a CAPTCHA generated by the CAPTCHA engine. Although the discussion herein primarily references images that are used as elements in a CAPTCHA, it should be appreciated that videos or animated images can also be used to represent "before" imagery, "after" imagery and incorrect responses for the CAPTCHA.

The network page server 219 can be executed to serve up content to client device 206. The content can include user interfaces 102 in which CAPTCHA tests can be embedded. The network page server 219 can also determine whether to grant or deny access to a particular resource based upon whether a CAPTCHA test embedded within a user interface 102 and presented to the client device 206 is correctly solved. For example, in order to access a certain resource, the network page server 219 might require a user to authenticate and also solve a CAPTCHA test generated by the CAPTCHA engine 218.

The data stored in the data store 212 includes, for example, scene data 221 and challenge response test data 227, and potentially other data. The scene data 221 can include information about various types of scenes from which images or video that form the basis for a CAPTCHA are drawn. The scene data 221 can represent a 2D or 3D model in which virtual objects can be placed and from which images or video can be rendered. The scene data 221 can specify the size of a scene, whether the scene is 2D or 3D, and other information about the scene.

Scene data 221 can include object properties 231 and a physics model 233. The scene data 221 can identify the location and properties of various objects at the starting point of a scene. Once defined by the CAPTCHA engine 218 or a user, the physics engine 215 can interpret the scene data. In some instances, the physics engine 215 can animate the scene and extract imagery from the animated scene for use in a CAPTCHA or challenge-response test. The object properties 231 represents data about objects that are placed within a 3D scene. Object properties 231 can include a location of the object within a scene. In one example, the location of the object within the scene can represent X, Y, and/or Z coordinates. The object properties 231 can also include physical properties 235, such as mass, density, viscosity, shading, color, velocity, momentum, acceleration, or other properties that might affect how the object behaves within the scene when the scene is animated and rendered. Each of the physical properties 235 can also have a parameter value 236. In some embodiments, the parameter value 236 for a particular physical property 235 can be modified so that the CAPTCHA engine 218 can generate incorrect response for presentation within a CAPTCHA user interface.

For example, the CAPTCHA engine 218 can capture a "before" image of a scene and then modify a density, mass or other physical property 235 of the object so that it behaves in a manner that is unexpected to the user. In one scenario, an object that apparently very small in mass, such as a feather, can be modified so that it has a very heavy mass. When animated by the physics engine 215, the feather might behave in an unexpected manner, which results in an incorrect answer choice that can be extracted as an image.

The physics model 233 associated with the scene can include the variables, parameters, and data that specify to the physics engine 215 how objects within a scene should interact with their environment when the scene is animated and rendered. In some embodiments, the physics model 233 for a scene can be Newtonian physics model. The physics model 233 can specify gravity, friction, and other physical properties that act on objects within the scene. In a Newtonian physics model 233, objects, when animated and rendered, should move and behave similarly to a real world environment. In other embodiments, a scene might represent space or another celestial environment, in which case a physics model 233 having varying gravity, friction, or other parameters can be chosen. For example, a moonscape might be presented in a scene. In this scenario, a lower gravity parameter can be chosen for the physics model 233.

The data store 212 can also store challenge response test data 227. The challenge response test data 227 can store data about challenge-response tests that are generated by the CAPTCHA engine 218. The challenge response test data 227 can data for each challenge-response test. For each test, the challenge response test data 227 can store images a challenge 237 that includes a "before" image along with a question associated with the image. For example, a challenge 237 can include a text-based question that queries the user about a scene represented in a "before" image. The challenge response test data 227 can also store one or more correct responses, or "after" images, that are generated by the physics engine 215, and one or more incorrect responses that are meant to be presented to the user along with correct responses as a part of a challenge-response test. The challenge response test data 227 can also identify which of the responses are the correct responses to a particular challenge-response test. In some cases, a particular challenge response test might have more than one correct answer.

The client device 206 is representative of a plurality of client devices 206 that can be coupled to the network 209. The client device 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 285. The display 285 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 can also execute a client application 287 that can render a user interface 102 on the display 285. For example, the client application 287 can be executed in a client device 206, for example, to access network content served up by the computing environment 203, thereby rendering a user interface 102 in which a CAPTCHA generated by the CAPTCHA engine 218 can be embedded. To this end, the client application 269 may include, for example, a browser or a special-purpose application, and the user interface 102 can include a network page, an application screen, etc. The client device 206 can also execute applications beyond the client application 287.

Next, additional discussion of how the CAPTCHA engine 218 can generate physics-based CAPTCHAs according to embodiments of the disclosure follows. As noted above, the CAPTCHA engine 218 can generate CAPTCHAs that are stored in the data store 212 as challenge-response test data 227. The CAPTCHA engine 218 can place objects in a scene in a position where an observable change will occur to the object when the scene is animated by the physics engine 215. The CAPTCHA engine 218 can extract a "before" image from the physics engine 218 as well as an "after" image. The "before" and "after" imagery can serve as the challenge and a correct response to a CAPTCHA. In some cases, the "before" imagery can serve as the challenge and the "after" imagery can serve as the correct response.

In this case, the "before" image can be accompanied with a question along the lines of "what happens next?" In response, the user can attempt to identify the "after" image in a user interface 102 in which various answer choices are presented. However, in other cases, the "after" imagery can serve as part of the challenge and the "before" imagery can serve as the correct response. In this scenario, the challenge can be accompanied with a question along the lines of "what happened before?" In response, the user can attempt to identify the "before" image in a user interface 102 in which various answer choices are presented.

The CAPTCHA engine 218 places objects within a scene, which can be a 2D scene or a 3D scene, at a position where an observable change will occur to the object or to its environment when the scene is animated by the physics engine 215. The CAPTCHA engine 218, as noted above, can obtain a "before" image before the scene is animated from the physics engine 215 and an "after" image after the scene is animated for some period of time. The period of time can be selected as an amount of time after which objects within the scene come to rest or after the objects within the scene change by a threshold amount. A change in this sense can mean the position of the object within the scene, a size of the object, a deformation of the object, or other measures of the change in an object. In other scenarios, an "after" image can be an editorial selection by a person curating a corpus of CAPTCHAs generated by the CAPTCHA engine 218.

Accordingly, the CAPTCHA engine 218 can extract an image that represents a part of the challenge 237 along with a question that can be posed with the image. Additionally, the CAPTCHA engine 218 can generate a correct response 239 for the CAPTCHA. In this sense, the correct response 239 represents an image that is consistent with the physics model 233 that is associated with the scene. In other words, one or more objects represented in the scene undergo an observable change that is consistent with real-world physics that can be observed by a human observer.

A scene that is used as the basis for a CAPTCHA can also be configured and arranged using variables that are chosen to make solving the CAPTCHA more difficult for machines. For example, colors and textures can be chosen that make tracking motion of an object through a scene more difficult. In one example, a white object on a white background, or an object having a similar color to a background, can be selected so that tracking motion of the object might be more difficult for a machine. In this scenario, the physics engine 215 can animate the scene because it has information about the objects within the scene, but a machine that is analyzing resultant imagery of the scene might be unable to track movement of the objects.

As an additional example, an object might be animated within a scene such that it moves between areas within the scene where lighting could vary. In this scenario, the physics engine 215 could again easily animate the scene because it has information about the objects, but a machine that is analyzing resultant imagery of the scene might be unable to track movement of the objects due to the change in lighting that is applied to the object as it moves through the scene.

The CAPTCHA engine 218 can also generate incorrect responses 241 by modifying the object or scene in ways that are apparent to a human observer but might be harder to determine by a machine. The CAPTCHA engine 218 can then request that the physics engine 215 re-render the scene and capture an incorrect "after" image to show the effect on the object after the object or scene are modified. In one example, the CAPTCHA engine 218 can modify physical properties 235 associated with an object. For example, the CAPTCHA engine 218 can modify an object representing a liquid such that it has the viscosity of a solid. Accordingly, if a liquid is positioned in a container that is mounted upside-down in a scene, the liquid might remain in the glass, which is inconsistent with the physics model 233 for the scene, or inconsistent with real-world physics.

As another example of generating incorrect responses 241, the CAPTCHA engine 218 might modify the physics model 233 itself and request that the physics engine 218 re-render the scene to generate incorrect responses 241. In one example, the CAPTCHA engine 218 might reverse gravity or edit the physics model to reflect a weightless environment on Earth, which might cause an "after" image that is inconsistent with real-world physics or a real-world physics model 233. The CAPTCHA engine 218 can modify other physical properties, such as magnetism, friction, momentum, or any other physical properties of the scene or objects in the scene to cause an observable change that is inconsistent with real-world physics or the physics model 233 used to generate the correct response 239.

As another example of generating incorrect responses 241, the CAPTCHA engine 218 can also modify the position of objects within the scene so that they are placed in positions that are inconsistent with an expected position of the object. For example, in the case of an "after" image that is being used as a possible response to a CAPTCHA, the CAPTCHA engine 218 can modify the Y coordinate position of the object such that the object appears in an unexpected position in the "after" image.

As another example of generating incorrect responses 241, the CAPTCHA engine 218 can also rotate the position of objects within the scene so that they are placed in positions that are inconsistent with an expected position of the object. For example, in the case of an "after" image that is being used as a possible response to a CAPTCHA, the CAPTCHA engine 218 can rotate the object such that the object appears in an unexpected rotational position in the "after" image. The CAPTCHA engine 218 can also generate incorrect responses 241 by modifying the position or appearance of background elements or background objects rather than by modifying the position or properties of foreground objects. For example, even though a scene might include foreground objects that interact with or affect one another, an incorrect response 241 can be generated by modifying the position or physical properties of a third object, such as a background object or any other object that would not ordinarily move when the scene is animated by the physics engine.

Additionally, an incorrect response 241 can be generated by modifying physical properties 235 of objects within a scene that are not related to movement of the object. For example, the color or texture of an object might be modified in an "after" image so that the object appears different that it appeared in the "before" image, which could represent an incorrect response 241 for a particular CAPTCHA. In one scenario, an incorrect response 241 can be generated by animating the scene so that the position of an object changes as expected according to the physics model 233 applied to the scene, but the color or texture applied to the object is changed.

Accordingly, upon generating a physics-based CAPTCHA that is stored in challenge-response test data 227, the CAPTCHA can be incorporated into a user interface 102 that can be used to grant or deny access to a resource by the network page server 219 or by any other system using the CAPTCHAs.

Figure 3A:
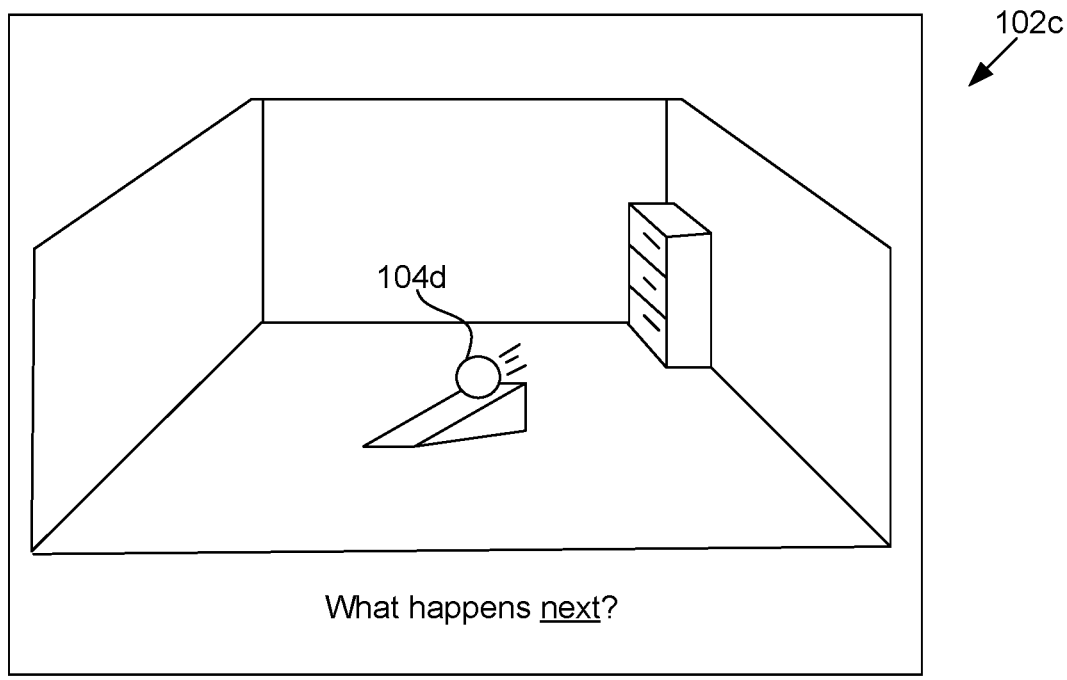
FIG. 3A is a pictorial diagram of an example user interface presenting a CAPTCHA challenge-response test to a user according to embodiments of the disclosure.

Referring next to FIG. 3A, shown is an alternative example of a CAPTCHA generated by the CAPTCHA engine 218 that can be integrated within a user interface 102c according to embodiments of the disclosure. In the depicted scene, an object 104d is placed at the top of a ramp. According to a physics model 233 that simulates real-world Newtonian physics, the object 104d should roll towards the bottom of the ramp when the scene is animated by the physics engine 218.

Figure 3B:
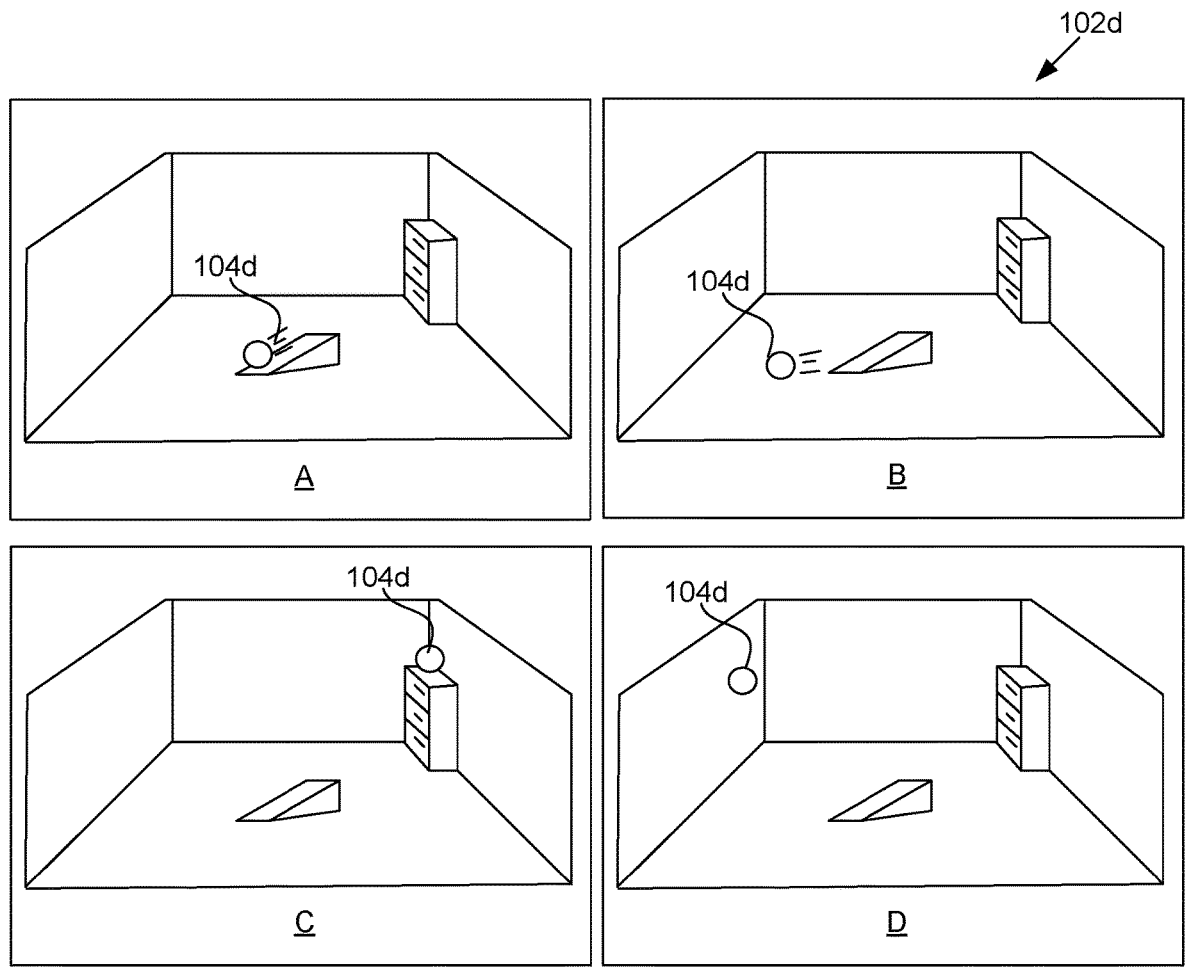
FIG. 3B is a pictorial diagram of an example user interface presenting a CAPTCHA challenge-response test to a user according to embodiments of the disclosure.

Moving onto FIG. 3B, shown is a user interface 102d that depicts the possible response choices that can be presented to the user. In option A, the object 104d is depicted in a position that is consistent with the physics model 233 of the scene because object 104d has rolled or traveled down the ramp due to the effect of a simulated gravity within the scene and specified by the physics model 233. In option B, the object 104d is depicted in a position that is also consistent with the physics model 233 because the object 104d has traveled further down and away from the ramp due to the effect of gravity. In this way, the CAPTCHA engine 218 can generate CAPTCHAs that have more than one correct answer choice and require the user to potentially select all of the correct answer choices.

In option B, the position of the object 104d has been modified such that its position in the "after" image is inconsistent with the physics model 233. Similarly, in option D, the position of the object 104d has been modified as well as potentially the simulated gravity component within the physics model 233, as the object is far away from the ramp and in an elevated position. In other words, the position of the object 104d in the "after" image of option D is inconsistent with a Newtonian physics model or real-world physics.

In some examples of a physics-based CAPTCHA, the challenge can direct a user to identify incorrect response choices rather than to identify correct response choices. In this scenario, a user interface that presents possible answer choices might present one incorrect response choice and three correct response choices.

Figure 4:
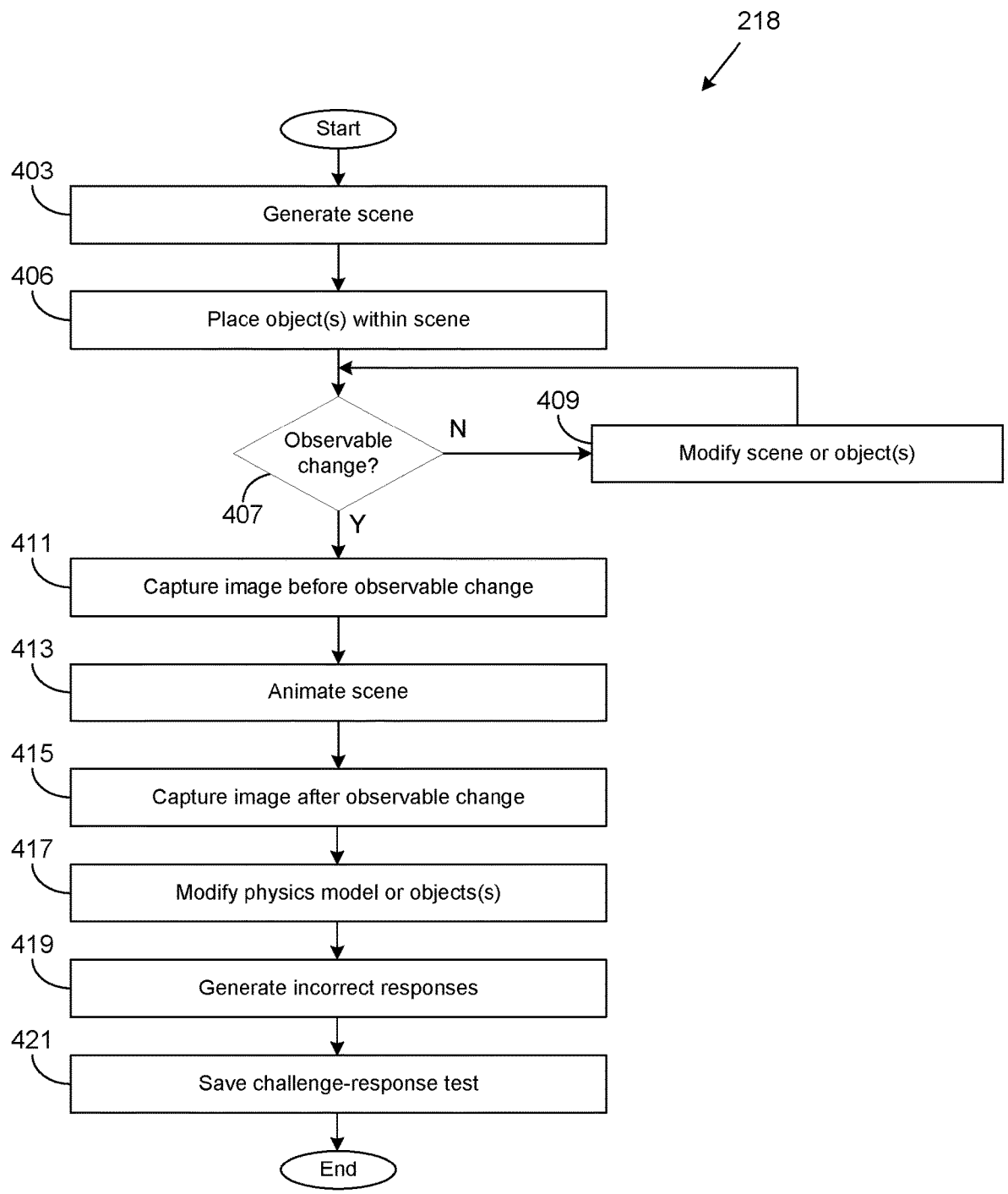
FIG. 4 is a flowchart illustrating one example of functionality implemented as portions of a CAPTCHA engine executed in a computing environment in the networked environment of FIG. 2 according to various embodiments of the present disclosure.

Referring next to FIG. 4, shown is a flowchart that provides one example of the operation of a portion of the CAPTCHA engine 218 according to various embodiments. It is understood that the flowchart of FIG. 4 provides merely an example of the many different types of functional arrangements that may be employed to implement the operation of the portion of the CAPTCHA engine 218 as described herein. As an alternative, the flowchart of FIG. 4 can be viewed as depicting an example of elements of a method implemented in the computing environment 203 according to one or more embodiments. FIG. 4 illustrates an example of how the CAPTCHA engine 218 can generate a physics-based CAPTCHA according to one example of the disclosure.

Beginning with box 403, the CAPTCHA engine 218 can generate a scene in which objects can be placed. The scene can be generated with a particular size and associated with a physics model 233. In many cases, a Newtonian physics model that simulates real-world physics can be chosen. The scene can be generated using an API provided by the physics engine 215. In some embodiments, the physics engine 215 can provide an API in which 2D or 3D scenes can be generated using API calls. The physics engine 215 can then animate and render images or video from the scene.

At box 406, the CAPTCHA engine 218 can place objects within the scene using the graphics API of the physics engine 215. At box 407, the CAPTCHA engine 218 can determine, based on the placement of the objects within the scene, whether an observable change will occur to the objects or other scene elements when the scene is animated. In some embodiments, the CAPTCHA engine 218 can determine how far an object placed into the scene will move or how much it will deform or otherwise change. If the object or scene will undergo an observable change that is insignificant, the CAPTCHA engine 218 can modify the scene or object at box 409 and again determine whether an observable change will occur to the scene. In one example, the CAPTCHA engine 218 can adjust the position of the object within the scene or modify the relative position of objects within the scene to one another.

If, at box 407, the CAPTCHA engine 218 determines that a significant observable change occurs to the object once the scene is animated, the process proceeds to box 411, where the CAPTCHA engine 218 obtains an image before the observable change. The image can be employed as the challenge 237. At box 413, the CAPTCHA engine instructs the physics engine to animate the scene. At box 415, the CAPTCHA engine can obtain one or more images after animation of the scene to capture imagery of the scene after an observable change to one or more of the objects within the scene. The one or more image can represent a correct response 241. In some instances, the one or more image can represent the challenge 237 and the image captured before the observable change can be employed as the correct response 241.

At box 417, the CAPTCHA engine can modify either the physics model employed by the scene or physical properties of the objects within the scene. At box 419, the CAPTCHA engine 218 can animate the scene with the modified objects or modified physics model to generate incorrect response choices that can be incorporated into the CAPTCHA. The CAPTCHA engine 218 can repeatedly perform this process to generate a multiple possible incorrect responses 243. At box 421, the CAPTCHA engine 219 can save the generated CAPTCHA in the data store 212 so that it can be used to grant or deny access to a resource by the network server 421 or any other service or application.

Figure 5:
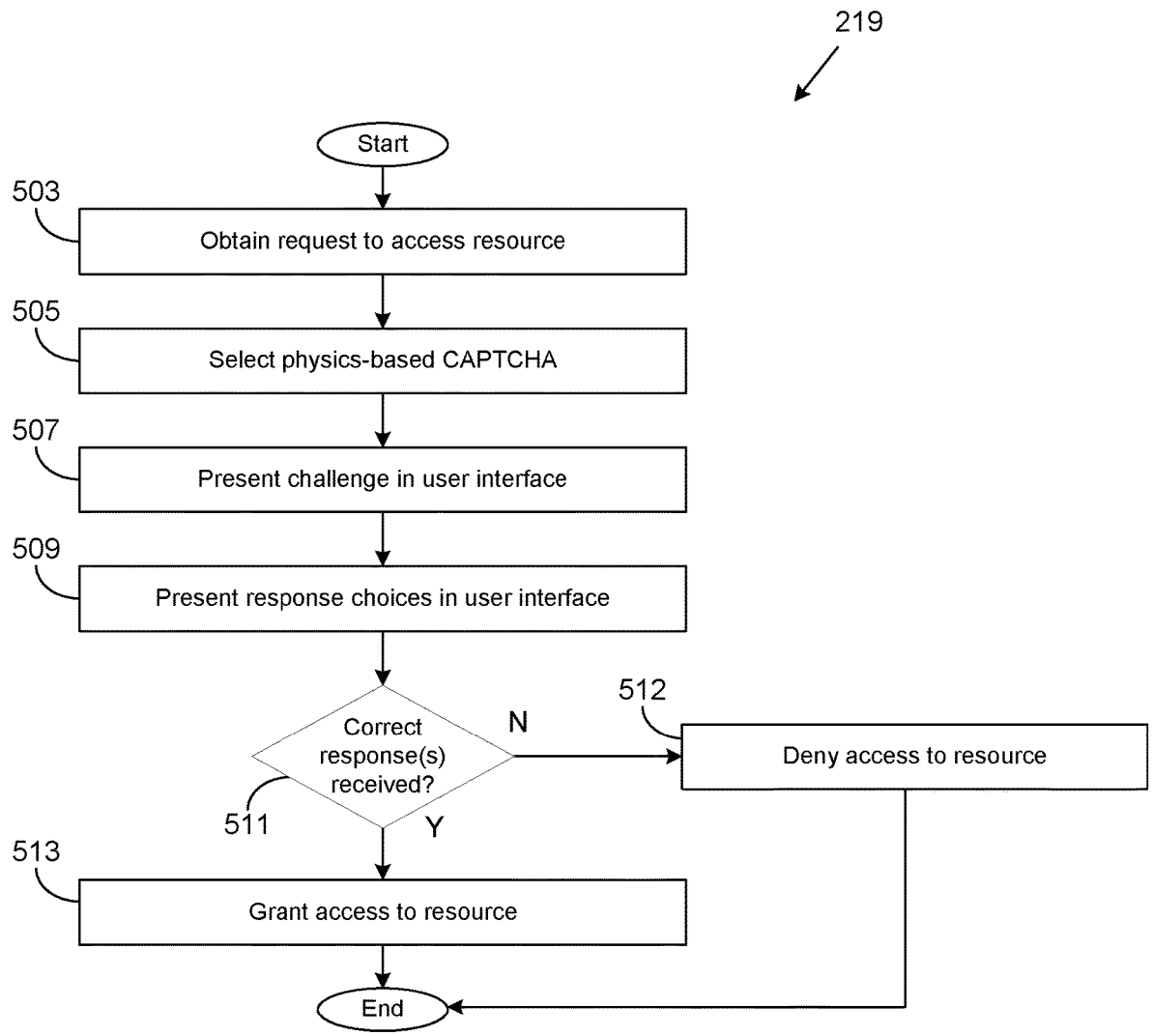
FIG. 5 is a flowchart illustrating one example of functionality implemented as portions of a network page server executed in a computing environment in the networked environment of FIG. 2 according to various embodiments of the present disclosure.

Referring next to FIG. 5, shown is a flowchart that provides one example of the operation of a portion of the network page server 219 according to various embodiments. It is understood that the flowchart of FIG. 5 provides merely an example of the many different types of functional arrangements that may be employed to implement the operation of the portion of the network page server 219 as described herein. As an alternative, the flowchart of FIG. 5 can be viewed as depicting an example of elements of a method implemented in the computing environment 203 according to one or more embodiments. FIG. 4 illustrates an example of how the network page server 219 can utilize a physics-based CAPTCHA according to one example of the disclosure.

First, at box 503, the network page server 219 can obtain a request to access a particular resource. As noted above, the request can comprise a request for a content page, a web page, or any content that the network page server 219 administrator wishes to secure behind a physics-based CAPTCHA. At box 505, the network page server 219 can select a physics-based CAPTCHA from the data store 212. The physics-based CAPTCHA can be selected randomly selected by the network page server 219 through an API provided by the data store 212 or the CAPTCHA engine 218.

At box 507, the network page server 219 present the challenge 237 associated with the physics-based CAPTCHA in a user interface 102. The challenge 237 can be presented as a question along with an image that is generated by the CAPTCHA engine 218. At box 509, the network page server 219 can present the possible responses associated with the CAPTCHA in a user interface 102. The correct response 239 as well as the incorrect response 241 can all be presented together along with a request that a selection of the correct response 239 be made. At box 511, the network page server 219 can determine whether the correct response 239 was selected. If the selection corresponds to an incorrect response 241, the network page server 219 can deny access to the resource at box 512. If the selection corresponds to a correct response 239, the network page server 219 can grant access to the resource at box 513. Thereafter, the process proceeds to completion.

Figure 6:
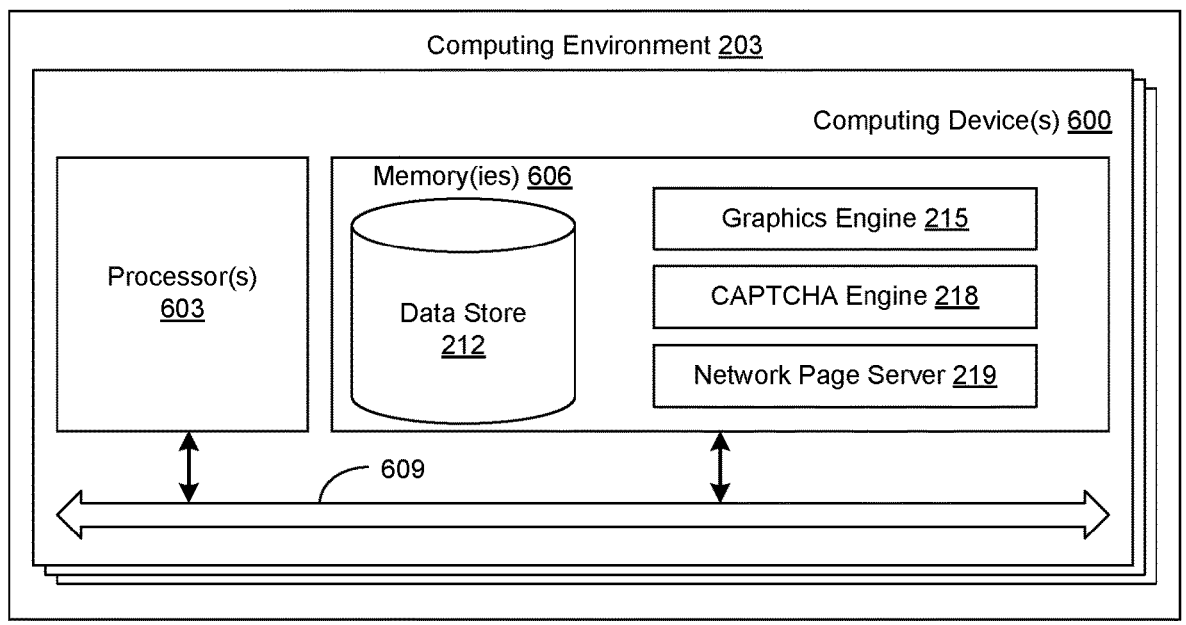
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the physics engine 215, CAPTCHA engine 218, network page server 219, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the physics engine 215, CAPTCHA engine 218, network page server 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the physics engine 215, CAPTCHA engine 218, and network page server 219. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the physics engine 215, CAPTCHA engine 218, and network page server 219, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the physics engine 215, CAPTCHA engine 218, and network page server 219, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
generate a three-dimensional (3D) scene having an object using a physics engine, the physics engine configured to simulate interactions of the object with an environment within the 3D scene;
place the object in the 3D scene so that a visually observable change occurs to the object based upon the interactions of the object with the environment within the 3D scene, wherein the visually observable change is consistent with a physics model implemented by the physics engine, wherein the physics model specifies that the object moves within the 3D scene according to Newtonian physics;

generate a first image of the 3D scene representing the object within the 3D scene before the visually observable change;

simulate the visually observable change to the object within the 3D scene using the physics engine;

generate a second image of the 3D scene representing the object within the 3D scene after the visually observable change;

present the first image of the 3D scene to a user in a user interface;

generate, by modifying a positional coordinate associated with the object after the visually observable change, a third image of the 3D scene representing the object within the 3D scene after the visually observable change;

present the second image along with a plurality of other images, wherein the plurality of other images represent the object represented in the 3D scene after a respective visually observable change that is inconsistent with the physics model implemented by the physics engine, at least one of the plurality of other images being the third image;

obtain a selection of one of the second image or one of the plurality of other images; and grant access to a resource when the selection corresponds to the second image.

2. The non-transitory computer-readable medium of claim 1, wherein when executed the program further causes the at least one computing device to deny access to the resource when the selection corresponds to one of the plurality of other images.

3. The non-transitory computer-readable medium of claim 1, wherein when executed the program further causes the at least one computing device to at least:

generate at least one other image of the 3D scene representing the object after another visually observable change, wherein the other visually observable scene is consistent with the physics model; and grant access to the resource when the selection corresponds to the second image and the at least one other image.

4. The non-transitory computer-readable medium of claim 1, wherein when executed the program further causes the at least one computing device to at least generate a determination that the selection was made by a human user in response to the selection corresponding to the second image.

5. A system, comprising:
at least one computing device; and
at least one application executed in the at least one computing device, wherein when executed the at least one application causes the at least one computing device to at least:
generate a three-dimensional (3D) scene using a physics engine in which an object is placed, the physics engine configured to simulate interactions of the object with an environment of the 3D scene, wherein the object is placed in a location within the 3D scene at which an observable change occurs in response to interactions with the environment, wherein the observable change is consistent with a physics model implemented by the physics engine, the physics model specifying that the object moves within the 3D scene according to Newtonian physics;

generate a first image of the 3D scene representing the object prior to the observable change;

generate a second image of the 3D scene representing the object after the observable change;

generate at least one other image representing the object after at least one other observable change that is inconsistent with Newtonian physics, wherein the at least one other image is generated by modifying a positional coordinate associated with the object after the observable change; and granting or denying access to a resource based upon a selection of the second image or the at least one other image.

6. The system of claim 5, wherein the at least one other image is generated by:
modifying a physical property associated with the object within the scene; and
simulating an effect of the modified physical property on the object.

7. The system of claim 6, wherein the physical property is modified by reducing a simulated gravity effect associated with the physics model.

8. The system of claim 6, wherein the physical property is modified by modifying at least one of a friction property, a viscosity property, an elasticity property, or a density property associated with the object.

9. The system of claim 5, wherein modifying the positional coordinate further comprises altering a position of the object such that the position is inconsistent with an effect of the environment on the object according to the physics engine.

10. The system of claim 5, wherein the environment comprises a plurality of other objects affecting a motion of the object through the 3D scene.

11. The system of claim 5, wherein access to the resource is granted or denied by:
generating a first user interface comprising the first image, the first user interface including a question associated with the 3D scene; and
generating a second user interface comprising the second image and at least one other image, the second user interface facilitating user selection of the second image or the at least one other image.

12. A method, comprising:
generating, via at least one computing device, a user interface comprising a challenge, the challenge comprising a first image associated with a scene in which an object is placed;
generating, via the at least one computing device, a correct response associated with the scene and at least one incorrect response associated with the scene, wherein the correct response comprises a second image after an observable change to the object within the scene, wherein the observable change is consistent with a physics model implemented by a physics engine, the physics model specifying that the object moves within the scene according to Newtonian physics, and the at least one incorrect response comprises at least one respective image after a respective incorrect observable change to the object within the scene that is inconsistent with Newtonian physics, wherein the at least one respective image is generated by modifying a positional coordinate associated with the object after the observable change; and determining, via the at least one computing device, whether to grant access to a resource based upon a selection of one of the correct response or the at least one incorrect response.

13. The method of claim 12, wherein the observable change to the object is determined based upon a physics model associated with the scene.

14. The method of claim 13, wherein the respective incorrect observable change to the object is generated by altering the object in a manner that is inconsistent with the physics model.

15. The method of claim 13, wherein the respective incorrect observable change to the object is generated by modifying a gravity property associated with the physics model and determining a position of the object using the modified gravity property.

16. The method of claim 13, wherein the respective incorrect observable change to the object is generated by modifying a coordinate associated with the object in a manner that is inconsistent with the physics model.

17. The method of claim 12, wherein the respective incorrect observable change comprises rotating the object within the scene.

18. The method of claim 12, wherein the scene comprises a plurality of objects and the second image comprises plurality of observable changes to the plurality of objects.

19. The method of claim 12, wherein the respective incorrect observable change to the object is generated by transposing the object with another object that is within the scene.

20. The method of claim 12, wherein the at least one incorrect response comprises at least two incorrect responses, and the determining, via the at least one computing device, whether to grant access to a resource is based upon the selection of the at least two incorrect responses.

* * * * *